United States Patent [19]  
Ohtsuka

[11] Patent Number: 4,748,869  
[45] Date of Patent: Jun. 7, 1988

[54] AUTOMATIC TRANSMISSION FOR AN AUTOMOTIVE VEHICLE

[75] Inventor: Kunio Ohtsuka, Yokohama, Japan

[73] Assignee: Nissan Motor Company, Limited, Kanagawa, Japan

[21] Appl. No.: 864,572

[22] Filed: May 19, 1986

Related U.S. Application Data

[63] Continuation of Ser. No. 461,224, Jan. 26, 1983, abandoned, and a continuation-in-part of Ser. No. 178,239, Aug. 13, 1980, abandoned.

[30] Foreign Application Priority Data

Aug. 14, 1979 [JP] Japan .................. 54-102831

[51] Int. Cl.⁴ .................... F16H 47/08; F16H 57/10
[52] U.S. Cl. .................... 74/677; 74/763; 74/765
[58] Field of Search ......... 74/677, 688, 764, 765, 74/762, 763

[56] References Cited

U.S. PATENT DOCUMENTS

| | | | |
|---|---|---|---|
| 2,725,762 | 12/1955 | Hettinger et al. | 74/688 |
| 2,894,415 | 7/1959 | Miller | 74/688 |
| 3,024,668 | 3/1962 | Kronogard et al. | 74/677 X |
| 3,486,398 | 12/1969 | Waclawek | 74/688 |
| 3,620,100 | 11/1971 | Chana | 74/688 |
| 3,835,732 | 9/1974 | Mori et al. | 74/765 X |
| 3,863,524 | 2/1975 | Mori et al. | 74/765 |
| 4,223,571 | 9/1980 | Quemerais et al. | 74/759 |
| 4,228,697 | 10/1980 | Miller | 74/758 |
| 4,282,773 | 8/1981 | Ohtsuka | 74/688 |
| 4,369,672 | 1/1983 | Ohtsuka | 74/688 |

FOREIGN PATENT DOCUMENTS

| | | | |
|---|---|---|---|
| 47-23622 | 7/1972 | Japan . | |
| 47-43658 | 12/1972 | Japan . | |
| 48-254 | 1/1973 | Japan . | |
| 52-74766 | 6/1977 | Japan | 74/764 |

Primary Examiner—Leslie A. Braun  
Assistant Examiner—David Novais  
Attorney, Agent, or Firm—Foley & Lardner, Schwartz, Jeffery, Schwaab, Mack, Blumenthal & Evans

[57] ABSTRACT

A transmission for an automotive vehicle, includes an input shaft, an ouput shaft, a coupling device having an input portion thereof connected to the input shaft, and a gear mechanism for transmitting the power from the input shaft to the output shaft in such a way that three forward and one reverse drives can be obtained. The gear mechanism including first, second, third and fourth rotatable members. The fourth rotatable member is connected to the output shaft. In addition, first and second clutches are provided between the gear means and the coupling device. The first clutch is connected to the first rotatable member of the gear mechanism. The second clutch is connected to the second rotatable member of the gear mechanism. First brake selectively brakes the third rotatable member of the gear mechanism. Second brake selectively brakes the second rotatable member of the gear mechanism. Further, the transmission includes a third clutch connected to the input shaft, and a planetary gear set having fifth, sixth and seventh rotatable members. The sixth and seventh rotatable members are connected to the gear mechanism. The fifth rotatable member is connected to the third clutch.

13 Claims, 5 Drawing Sheets

AUTOMATIC TRANSMISSION FOR AN AUTOMOTIVE VEHICLE

CROSS-REFERENCE TO THE RELATED APPLICATION

This application is a continuation of application Ser. No. 461,224 filed Jan. 26, 1983 now abandoned and a continuation-in-part application of Ser. No. 178,239 filed on Aug. 13, 1980, now abandoned, claiming priority based on Japanese Patent application No. 54-102831 filed on Aug. 14, 1979, entitled "Automatic Transmission for an Automotive Vehicle", which is now pending.

BACKGROUND OF THE INVENTION

This invention relates to an automatic transmission for an automotive vehicle wherein four forward speed power trains with an over-driving ratio and a reverse power train can be provided between the engine and the driving wheels of the vehicle.

A variety of gear trains or speed changing mechanisms with an over-driving ratio have been proposed in particular for the purpose of reducing fuel costs to promote the more efficient utilization and conservation of energy resources. According to the prior art transmissions of this type, however, one or more of the following defects can not be eliminated.

(1) Only a limited number of driving ratios can be provided so that it is difficult to obtain a sufficient number of proper driving ratios.

(2) A certain member of the gear trains rotates at an extremely high speed.

(3) The transmissions are complicated in construction. The number of parts increases.

(4) Speed change control is complicated.

For example, an automotive vehicle transmission employing an over-drive mechanism is disclosed in U.S. Pat. No. 2,725,762 patented Dec. 6, 1955 to Wayman et al. This transmission includes three friction clutches and two friction brakes. The clutch which is connected to an input shaft is additionally provided to a carrier of the third speed gear train. Although the construction of the transmission is simple, the defects (1) and (2) as specified above can not be completely eliminated.

Another transmission for an automotive vehicle is disclosed in the Japanese Patent Publication No. 51-9092, in which a gear set and a brake are added so as to provide an over-drive ratio. In this transmission, the construction thereof is simple, and setting of all desired gear ratios is relatively flexible, but still the defect (2) as above-stated can not be eliminated.

SUMMARY OF THE INVENTION

It is an object of the present invention to provide an automatic transmission for an automotive vehicle in which an over-drive ratio can be obtained without providing any additional brakes.

A further object of the present invention is to provide an automatic transmission for an automotive vehicle with an over-drive gear ratio in which setting of four forward and one reverse drives is easy.

Another object of the present invention is to provide an automatic transmission for an automotive vehicle in which the number of parts thereof is small with their simple construction.

According to the present invention, an automatic transmission for an automotive vehicle includes a gear train set with three forward and one reverse drive ratios which has, between an input shaft and an output shaft, a torque converter; a first planetary gear set having four rotatable members such as a sun gear, a carrier for a planetary pinion and a ring gear, first and second friction clutches, and two friction brakes.

A transmission according to the present invention is additionally equipped with a second planetary gear set and a third clutch. The second planetary gear set includes three rotatable members: for example, a sun gear, a carrier for a planetary pinion and a ring gear. One of those members is connected through the third clutch to the input shaft. The other rotatable members of the second planetary gear set are connected to two members selected from the rotatable members of the first planetary gear set.

The fourth forward drive ratio is obtained in such a way that the third clutch and one of the brakes are engaged while the first and second clutches and the other brake are disengaged.

DETAILED DESCRIPTION OF THE PREFERRED EMBODIMENTS

Figure 1:
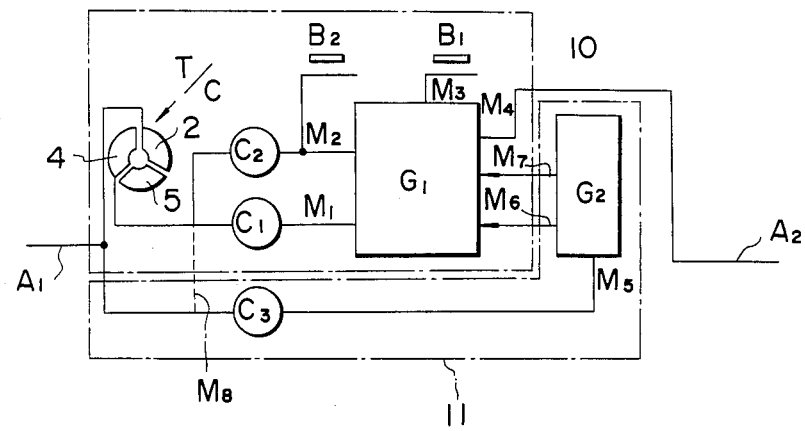
FIG. 1 is a schematic diagram of a transmission according to a first embodiment of the present invention.

FIG. 1 is a schematic diagram of an automatic transmission for an automotive vehicle according to the present invention. The reference numeral 10 designates a conventionally well-known gear train set with three forward and one reverse drive ratios. The gear train set 10 includes, between an input shaft $A_1$ and an output shaft $A_2$, a torque converter T/C; a planetary gear set $G_1$ having four rotatable members $M_1$ through $M_4$ which are for example a sun gear, a carrier for a planetary pinion and a ring gear, respectively; two friction clutches $C_1$, $C_2$; and two friction brakes $B_1$, $B_2$. The construction and operation of the gear train set 10 is substantially the same as that of the prior art so that the details thereof are not described herein. Table 1 shows the relationships among the clutches $C_1$, $C_2$ and the brakes $B_1$, $B_2$. The circles in Table 1 show that the clutches $C_1$, $C_2$ and brakes $B_1$, $B_2$ are engaged.

TABLE 1

|  | $C_1$ | $C_2$ | $B_1$ | $B_2$ |
|---|---|---|---|---|
| $F_1$ | o |  | o |  |
| $F_2$ | o |  |  | o |
| $F_3$ | o | o |  |  |
| R |  | o | o |  |

According to a first embodiment of the present invention, a planetary gear set $G_2$ and a clutch $C_3$ are additionally provided in a portion denoted by the chain line 11. The planetary gear set $G_2$ includes three rotatable members $M_5$ to $M_7$ which are for example a sun gear, a carrier for a planetary pinion and a ring gear. The member $M_5$ thereof is connected through the clutch $C_3$ to the input shaft $A_1$. In another aspect of the present invention, the rotatable member $M_5$ may be connected through the clutch $C_3$ to an output member which in turn is connected to the converter T/C. The other rotatable members $M_6$, $M_7$ are connected to two members selected from the rotatable members $M_1$ through $M_4$ within the gear train set 10, which will be hereinafter described.

The fourth forward drive ratio is obtained in such a way that the clutch $C_3$ and the brake $B_2$ are engaged while the other clutches $C_1$, $C_2$ and brake $B_1$ are disengaged.

Setting of the drive ratios is easy and flexible in the planetary gear set $G_2$. Also, the relationships among the rotatable members can be easily varied or selected so as to provide various proper characteristics of the transmission. In addition, the over-drive gear ratio can be obtained independently from the other gear ratios. Further, no extremely high speed rotation of some member occurs.

On the other hand, in general, the load on the torque converter T/C increases if a gear train for the over-drive gear ratio is added. As a result, slippage of the torque converter is apt to occur, which makes it difficult to improve fuel consumption. Therefore, when the over-drive gear train is added, a so called lock-up clutch is often used so as to mechanically connect the pump impeller of the torque converter with a turbine runner to prevent the torque converter from slipping.

According to the first embodiment of the present invention, however, the rotatable member $M_5$ is connected through the clutch $C_3$ to the input shaft $A_1$ so that power is transmitted directly from the input shaft $A_1$ to the rotatable member $M_5$ through the clutch $C_3$, bypassing the torque converter T/C. Thus, loss of power due to slippage of the torque converter T/C can be avoided.

If the clutches $C_1$ and $C_3$ are engaged so as to obtain the third forward speed, the transmission operates in a condition of split drive by the combination of: the power coming through the torque converter and the clutch $C_1$ in a fluid connection; and the power directly coming from the input shaft $A_1$ through the clutch $C_3$ in a mechanical connection. During such a split drive, oscillations of the transmission due to rotation can be reduced. Also, the loss of power at the torque converter can be reduced. Thus, fuel consumption can be remarkably improved. If oscillations of the transmission can be neglected during the third speed drive under certain conditions, the three clutches $C_1$, $C_2$, $C_3$ can be designed to be engaged so that a complete mechanical connection is obtained to prevent the torque converter from slipping.

According to the first embodiment of the invention, the clutch $C_3$ can function in fact as a locking-up clutch so that no clutch need be added to a conventional three-speed gear train set in order to provide four forward drives including an over-drive. As compared with the prior art transmissions employing a locking-up clutch, therefore, one clutch can be omitted.

FIGS. 2 through 13 illustrate various embodiments of the invention in which the rotatable elements $M_1$ to $M_4$, $M_6$ and $M_7$ are connected in different forms. In the different views of the drawings, like reference numerals designate identical parts.

Tables 2 to 13 show the relationships between the clutches $C_1$, $C_2$ $C_3$ and brakes $B_1$, $B_2$ at the different drives $F_1-F_4$, R. $F_1$, $F_2$, $F_3$ and $F_4$ show the first, second, third and fourth forward drives, respectively. R shows the reverse drive. The circles in Tables 2 to 13 show that those elements are engaged. $\alpha_1$ to $\alpha_3$ are the gear ratios of the ring gears $R_1$, $R_2$ and $R_3$ to the sun gears $S_1$, $S_2$ and $S_3$, respectively.

Figure 2:
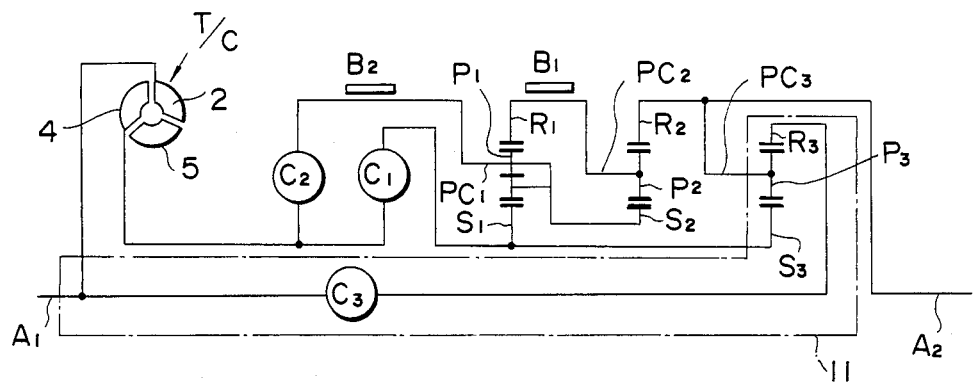
FIGS. 2 through 13 show the second through thirteenth embodiments of the present invention, respectively, and in particular the relationships between a number of rotatable members thereof.

In FIG. 2, the torque converter T/C has a pump impeller 2 connected to the input shaft $A_1$, and a turbine runner 4 which is connected through the clutch $C_1$ to sun gears $S_1$ and $S_3$ and through the clutch $C_2$ to a sun gear $S_2$ and a carrier $PC_1$. The carrier $PC_1$ can be braked by the brake $B_2$. The numeral 5 designates a stator of the torque converter T/C.

A planetary pinion $P_1$ engaging the sun gear $S_1$ is engaged with a ring gear $R_1$ which in turn in connected to a carrier $PC_2$ supporting a planetary pinion $P_2$. Such a gear train can be braked by the brake $B_1$. The sun gear $S_2$ is connected to the carrier $PC_1$ and engages the planetary pinion $P_2$ engaging a ring gear $R_2$. The ring gear $R_2$ is connected to a carrier $PC_3$ supporting a planetary pinion $P_3$ and is connected to the output shaft $A_2$. A ring gear $R_3$ engaging the planetary pinion $P_3$ is connected through the clutch $C_3$ to the input shaft $A_1$.

As compared with the embodiment in FIG. 2, FIGS. 3 through 13 show embodiments wherein only the portion denoted by the chain line 11 corresponding to the planetary gear set $G_2$ in FIG. 1 and the connecting relationships thereof to the other elements are different. The explanation of the common portions of those embodiments is omitted.

Figure 3:
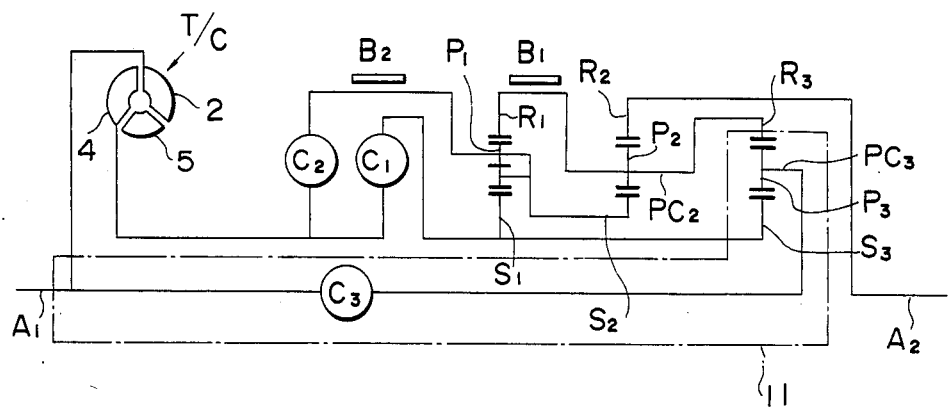

In FIG. 3, the input shaft $A_1$ is connected through the clutch $C_3$ to the carrier $PC_3$. The sun gear $S_3$ is connected to the sun gear $S_1$ and the clutch $C_1$. The ring gear $R_3$ is connected to the carrier $PC_2$.

Figure 4:
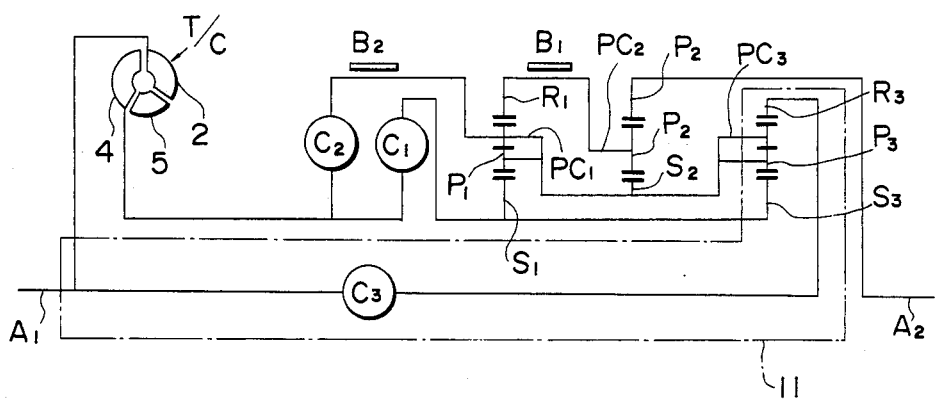

In FIG. 4, the ring gear $R_3$ is connected through the clutch $C_3$ to the input shaft $A_1$. The carrier $PC_3$ supporting the planetary pinion $P_3$ is connected to the sun gear $S_2$ and the carrier $PC_1$. The sun gear $S_3$ is connected to the sun gear $S_1$ and the clutch $C_1$.

Figure 5:
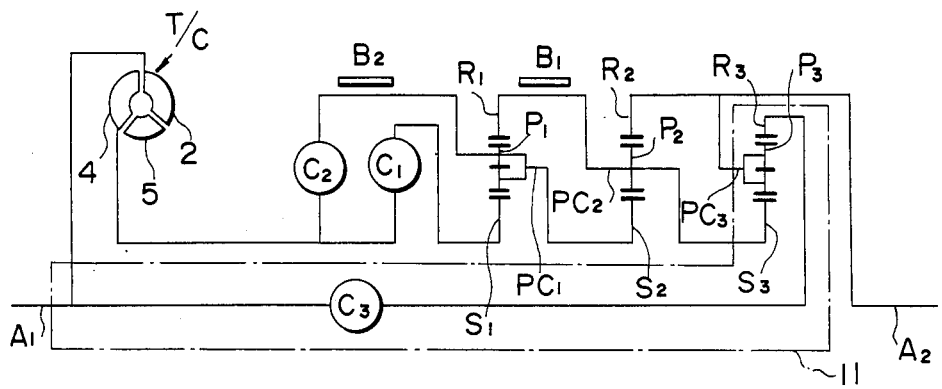

In FIG. 5, the ring gear $R_3$ is connected through the clutch $C_3$ to the input shaft $A_1$. The sun gear $S_3$ is connected to the carrier $PC_2$. The carrier $PC_3$ supporting the planetary pinion $P_3$ is connected to the ring gear $R_2$ and the output shaft $A_2$.

Figure 6:
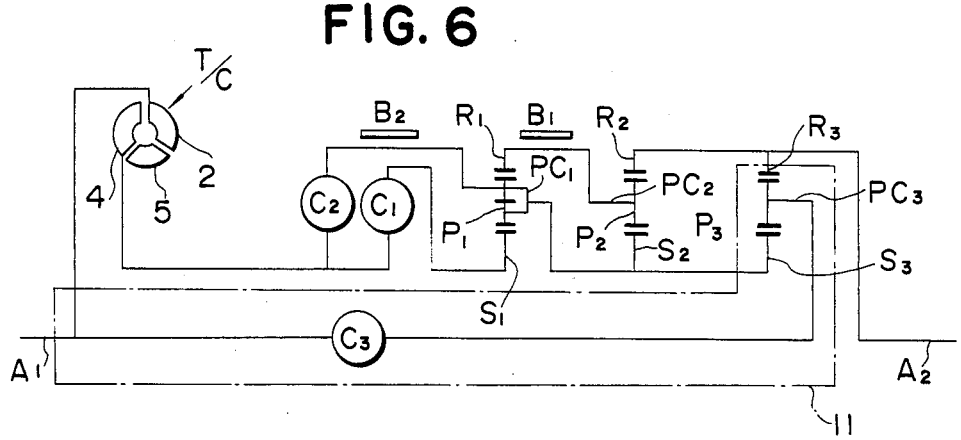

In FIG. 6, the ring gear $R_3$ is connected to the ring gear $R_2$ and the output shaft $A_2$. The carrier $PC_3$ is connected to the clutch $C_3$. The sun gear $S_3$ is connected to the sun gear $S_2$ and the carrier $PC_1$.

Figure 7:
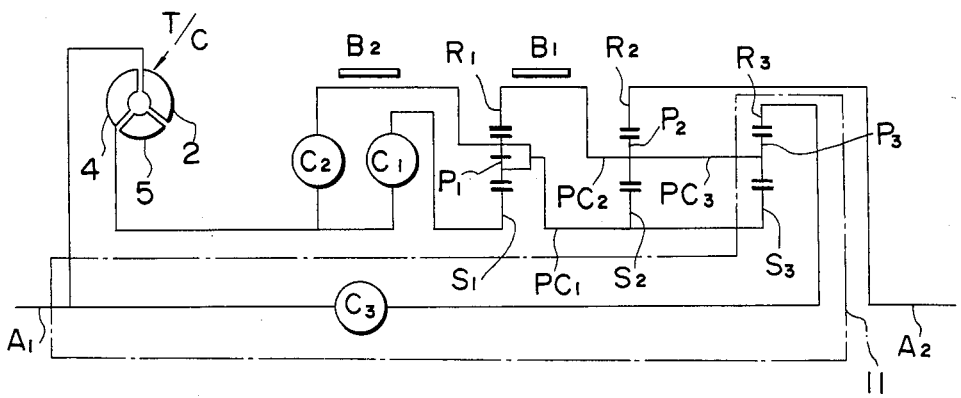

In FIG. 7, the ring gear $R_3$ is connected through the clutch $C_3$ to the input shaft $A_1$. The carrier $PC_3$ is connected to the carrier $PC_2$. The sun gear $S_3$ is connected to the sun gear $S_2$ and the carrier $PC_1$.

Figure 8:
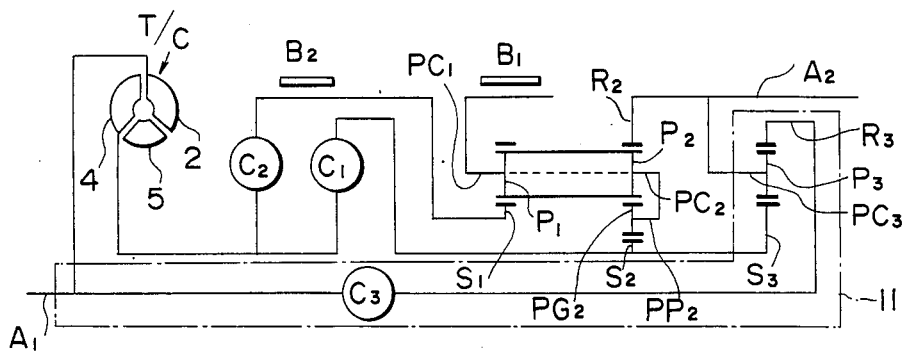

In FIG. 8, the input shaft $A_1$ is connected through the clutch $C_3$ to the ring gear $R_3$. The clutch $C_1$ is connected to the sun gear $S_2$ and $S_3$. The clutch $C_2$ is connected to the sun gear $S_1$. The carrier $PC_1$ supporting the planetary pinion $P_1$ engaging the sun gear $S_1$ can be braked by the brake $B_1$. Also, the carrier $PC_1$ connected through the carrier $PC_2$ to a pinion $PP_2$ supporting a pinion gear $PG_2$. The pinion gear $PG_2$ is engaged with the planetary pinion $P_2$. The ring gear $R_2$ engaging with the planetary pinion $P_2$ is connected to the carrier $PC_3$ and the output shaft $A_2$. The planetary pinion $P_1$ engaging the sun gear $S_1$ is connected to the planetary gear $P_2$.

Figure 9:
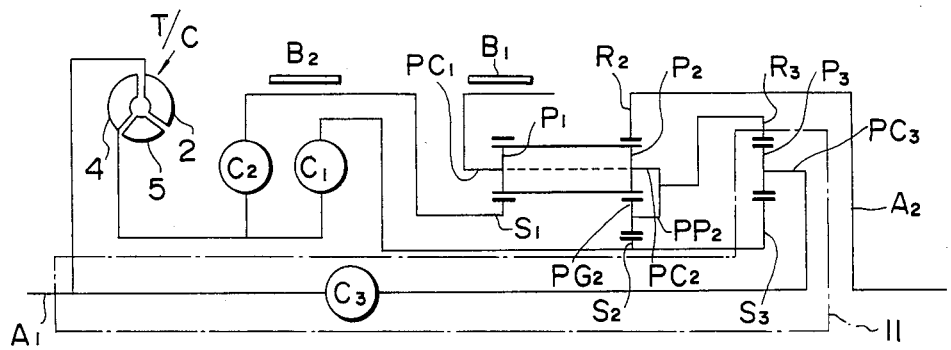

In FIG. 9, the carrier $PC_3$ is connected to the clutch $C_3$. The ring gear $R_3$ is connected to the carrier $PC_2$ and the pinion $PP_2$. The sun gear $S_3$ is connected to the clutch $C_1$ and the sun gear $S_2$. The other construction of this embodiment is substantially the same as that of the embodiment in FIG. 8.

Figure 10:
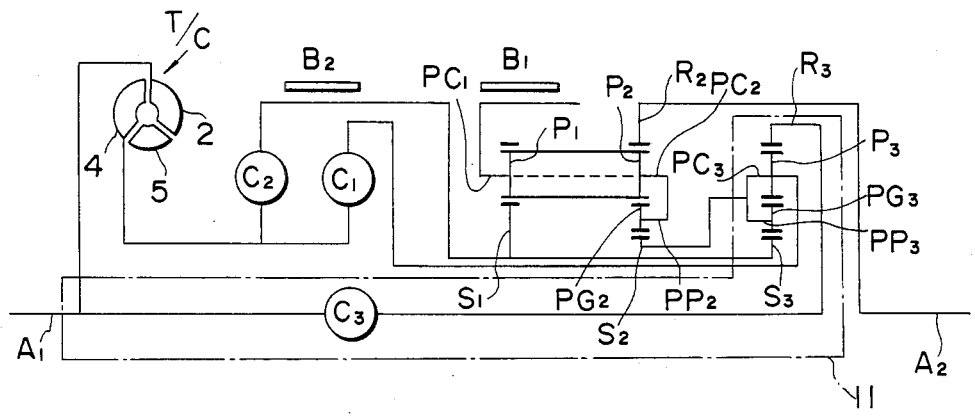

In FIG. 10, the ring gear $R_3$ is connected through the clutch $C_3$ to the input shaft $A_1$. The carrier $PC_3$ is connected to the clutch $C_1$, a pinion pin $PP_3$ and the sun gear $S_2$. The sun gear $S_3$ is connected to the sun gear $S_1$. The other construction of this embodiment is similar to that of the embodiment in FIG. 8.

Figure 11:
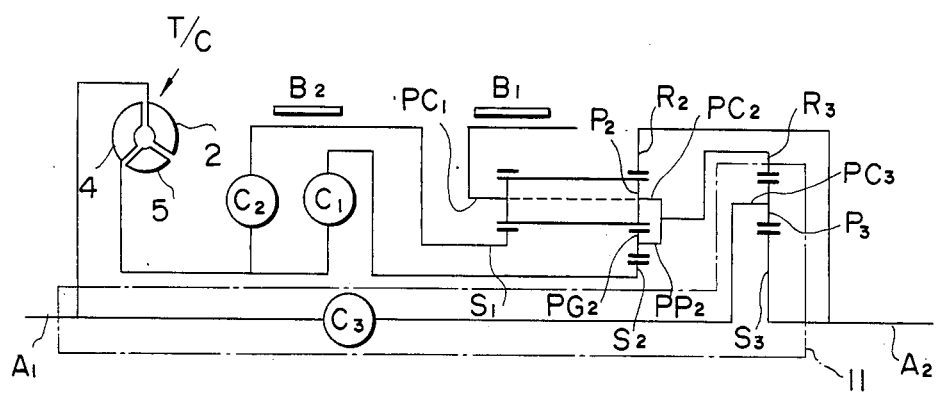

In FIG. 11, the input shaft $A_1$ is connected through the clutch $C_3$ to the carrier $PC_3$. The sun gear $S_3$ is connected to the output shaft $A_2$ and the ring gear $R_2$. The ring gear $R_3$ is connected to the carrier $PC_2$ and the pinion pin $PP_2$. Except such a point, this embodiment is similar to the embodiment of FIG. 10.

Figure 12:
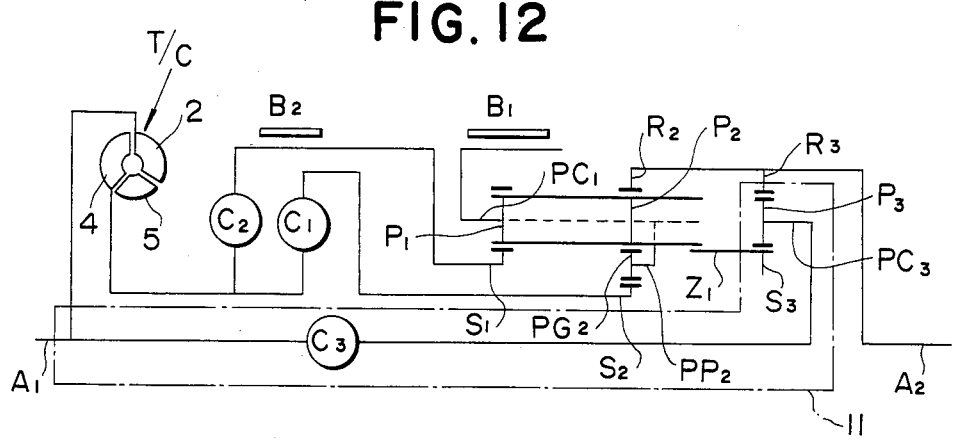

In FIG. 12, the input shaft $A_1$ is connected through the clutch $C_3$ to the carrier $PC_3$. The ring gear $R_3$ is connected to the ring gear $R_2$ and the output shaft $A_2$. The sun gear $S_3$ is connected through a gear $Z_1$ integrally formed therewith to the planetary pinion $P_2$.

Figure 13:
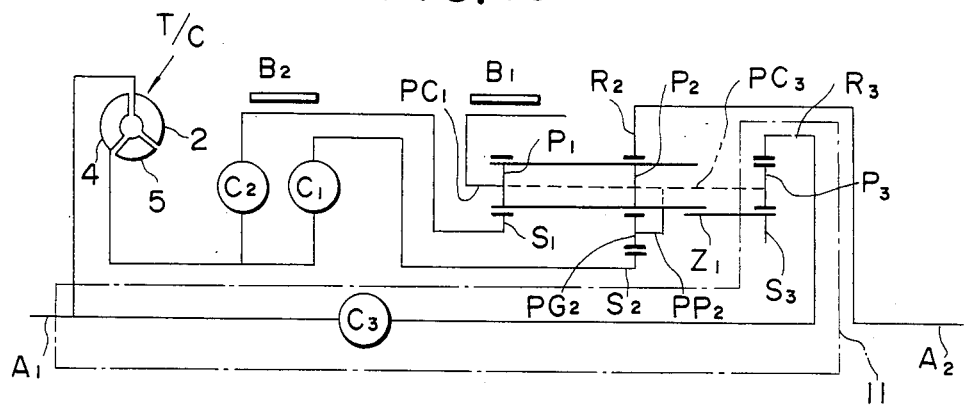

In FIG. 13, the ring gear $R_3$ is connected through the clutch $C_3$ to the input shaft $A_1$. The carrier $PC_3$ is connected to the pinion pin $PP_2$ and the carrier $PC_1$. The sun gear $S_3$ is connected through the gear $Z_1$ to the planetary gear $P_2$.

It is preferable in the above-stated embodiments that a coupling device such as the torque converter T/C or a fluid coupling is provided between the input shaft $A_1$ and the first and second clutches $C_1$, $C_2$, but a mechanical coupling device such as a centrifugal clutch may be also used in place thereof.

All of the clutches and brakes employed by the present transmission may be of the friction type and each may be controlled by means of fluid pressure. Also, this contributes greatly to the smoothness of operation of the transmission.

As can be seen from the foregoing, according to a transmission of the present invention, the numbers of parts does not increase as compared with the prior art. Suitable gear ratios can be easily obtained by selecting the connections between the rotatable members. Also, no members rotate at an extremely high speed.

TABLE 2

$\alpha_1 = 0.45$, $\alpha_2 = 0.45$, $\alpha_3 = 0.45$

| | $C_1$ | $C_2$ | $C_3$ | $B_1$ | $B_2$ | gear ratio | |
|---|---|---|---|---|---|---|---|
| $F_1$ | o | | o | | | $\dfrac{1 - \alpha_1}{\alpha_1\alpha_2}$ | 2.716 |
| $F_2$ | o | | | | o | $\dfrac{1}{\alpha_1(1 + \alpha_2)}$ | 1.533 |
| $F_3$ | o | o | | | | 1 | 1.000 |
| $F_4$ | | o | o | | | $1 + \alpha_2 - \dfrac{\alpha_3}{\alpha_1(1 + \alpha_2)}$ | 0.760 |
| R | | o | | o | | $-\dfrac{1}{\alpha_2}$ | −2.222 |

TABLE 3

$\alpha_1 = 0.5$, $\alpha_2 = 0.45$, $\alpha_3 = 0.45$

| | $C_1$ | $C_2$ | $C_3$ | $B_1$ | $B_2$ | gear ratio | |
|---|---|---|---|---|---|---|---|
| $F_1$ | o | | o | | | $\dfrac{1 - \alpha_1}{\alpha_1\alpha_2}$ | 2.222 |
| $F_2$ | o | | | | o | $\dfrac{1}{\alpha_1(1 + \alpha_2)}$ | 1.379 |
| $F_3$ | o | o | | | | 1 | 1.000 |

TABLE 3-continued $\alpha_1 = 0.5$, $\alpha_2 = 0.45$, $\alpha_3 = 0.45$

| | $C_1$ | $C_2$ | $C_3$ | $B_1$ | $B_2$ | gear ratio | |
|---|---|---|---|---|---|---|---|
| $F_4$ | | o | o | | | $\dfrac{\alpha_1 + \alpha_3}{\alpha_1(1 + \alpha_2)(1 + \alpha_3)}$ | 0.904 |
| R | | o | | o | | $-\dfrac{1}{\alpha_2}$ | −2.222 |

TABLE 4

$\alpha_1 = 0.45$, $\alpha_2 = 0.45$, $\alpha_3 = 0.45$

| | $C_1$ | $C_2$ | $C_3$ | $B_1$ | $B_2$ | gear ratio | |
|---|---|---|---|---|---|---|---|
| $F_1$ | o | | | | o | $\dfrac{1 - \alpha_1}{\alpha_1\alpha_2}$ | 2.716 |
| $F_2$ | o | | | | o | $\dfrac{1}{\alpha_1(1 + \alpha_2)}$ | 1.533 |
| $F_3$ | o | | o | | | 1 | 1.000 |
| $F_4$ | | | o | | o | $\dfrac{\alpha_3}{\alpha_1(1 + \alpha_2)}$ | 0.690 |
| R | | o | | o | | $-\dfrac{1}{\alpha_2}$ | −2.222 |

TABLE 5

$\alpha_1 = 0.45$, $\alpha_2 = 0.45$, $\alpha_3 = 0.45$

| | $C_1$ | $C_2$ | $C_3$ | $B_1$ | $B_2$ | gear ratio | |
|---|---|---|---|---|---|---|---|
| $F_1$ | o | | | | o | $\dfrac{1 - \alpha_1}{\alpha_1\alpha_2}$ | 2.716 |
| $F_2$ | o | | | | o | $\dfrac{1}{\alpha_1(1 + \alpha_2)}$ | 1.533 |
| $F_3$ | o | o | | | | 1 | 1.000 |
| $F_4$ | | | o | | o | $1 - \dfrac{\alpha_2\alpha_3}{1 + \alpha_2}$ | 0.860 |
| R | | o | | o | | $-\dfrac{1}{\alpha_2}$ | −2.222 |

TABLE 6

$\alpha_1 = 0.45$, $\alpha_2 = 0.45$, $\alpha_3 = 0.45$

| | $C_1$ | $C_2$ | $C_3$ | $B_1$ | $B_2$ | gear ratio | |
|---|---|---|---|---|---|---|---|
| $F_1$ | o | | | | o | $\dfrac{1 - \alpha_1}{\alpha_1\alpha_2}$ | 2.716 |
| $F_2$ | o | | | | o | $\dfrac{1}{\alpha_1(1 + \alpha_2)}$ | 1.533 |
| $F_3$ | o | o | | | | 1 | 1.000 |
| $F_4$ | | | o | | o | $\dfrac{1}{1 + \alpha_3}$ | 0.690 |
| R | | o | | o | | $-\dfrac{1}{\alpha_2}$ | −2.222 |

TABLE 7

$\alpha_1 = 0.5$
$\alpha_2 = 0.5$
$\alpha_3 = 0.35$

| | $C_1$ | $C_2$ | $C_3$ | $B_1$ | $B_2$ | gear ratio | |
|---|---|---|---|---|---|---|---|
| $F_1$ | o | | | | o | $\dfrac{1-\alpha_1}{\alpha_1\alpha_2}$ | 2.000 |
| $F_2$ | o | | | o | | $\dfrac{1}{\alpha_1(1+\alpha_2)}$ | 1.333 |
| $F_3$ | o | | o | | | 1 | 1.000 |
| $F_4$ | | | o | | o | $\dfrac{1+\alpha_3}{1+\alpha_2}$ | 0.900 |
| R | | o | | o | | $-\dfrac{1}{\alpha_2}$ | −2.000 |

TABLE 8

$\alpha_1 = 0.4$
$\alpha_2 = 0.4$
$\alpha_3 = 0.4$

| | $C_1$ | $C_2$ | $C_3$ | $B_1$ | $B_2$ | gear ratio | |
|---|---|---|---|---|---|---|---|
| $F_1$ | o | | | o | | $\dfrac{1}{\alpha_2}$ | 2.500 |
| $F_2$ | o | | | | o | $\dfrac{\alpha_1+\alpha_2}{\alpha_2(1+\alpha_1)}$ | 1.429 |
| $F_3$ | o | | o | | | 1 | 1.000 |
| $F_4$ | | | o | | o | $1-\dfrac{\alpha_1\alpha_3(1-\alpha_2)}{\alpha_2(1+\alpha_1)}$ | 0.829 |
| R | | o | | o | | $-\dfrac{1}{\alpha_1}$ | −2.500 |

TABLE 9

$\alpha_1 = 0.4$
$\alpha_2 = 0.4$
$\alpha_3 = 0.35$

| | $C_1$ | $C_2$ | $C_3$ | $B_1$ | $B_2$ | gear ratio | |
|---|---|---|---|---|---|---|---|
| $F_1$ | o | | | o | | $\dfrac{1}{\alpha_2}$ | 2.500 |
| $F_2$ | o | | | | o | $\dfrac{\alpha_1+\alpha_2}{\alpha_2(1+\alpha_1)}$ | 1.429 |
| $F_3$ | o | | o | | | 1 | 1.000 |
| $F_4$ | | | o | | o | $\dfrac{\alpha_2+\alpha_2\alpha_3+\alpha_3\alpha_1}{\alpha_2(1+\alpha_1)(1+\alpha_3)}$ | 0.899 |
| R | | o | | o | | $-\dfrac{1}{\alpha_1}$ | −2.500 |

TABLE 10

$\alpha_1 = 0.4$
$\alpha_2 = 0.4$
$\alpha_3 = 0.4$

| | $C_1$ | $C_2$ | $C_3$ | $B_1$ | $B_2$ | gear ratio | |
|---|---|---|---|---|---|---|---|
| $F_1$ | o | | | o | | $\dfrac{1}{\alpha_2}$ | 2.500 |
| $F_2$ | o | | | | o | $\dfrac{\alpha_1+\alpha_2}{\alpha_2(1+\alpha_1)}$ | 1.429 |
| $F_3$ | o | | o | | | 1 | 1.000 |
| $F_4$ | | | o | | o | $\dfrac{(1-\alpha_3)(\alpha_1+\alpha_2)}{\alpha_2(1+\alpha_1)}$ | 0.857 |

TABLE 10-continued $\alpha_1 = 0.4$
$\alpha_2 = 0.4$
$\alpha_3 = 0.4$

| | $C_1$ | $C_2$ | $C_3$ | $B_1$ | $B_2$ | gear ratio | |
|---|---|---|---|---|---|---|---|
| R | | o | | o | | $-\dfrac{1}{\alpha_1}$ | −2.500 |

TABLE 11

$\alpha_1 = 0.4$
$\alpha_2 = 0.4$
$\alpha_3 = 0.4$

| | $C_1$ | $C_2$ | $C_3$ | $B_1$ | $B_2$ | gear ratio | |
|---|---|---|---|---|---|---|---|
| $F_1$ | o | | | o | | $\dfrac{1}{\alpha_2}$ | 2.500 |
| $F_2$ | o | | | | o | $\dfrac{\alpha_1+\alpha_2}{\alpha_2(1+\alpha_1)}$ | 1.429 |
| $F_3$ | o | | o | | | 1 | 1.000 |
| $F_4$ | | | o | | o | $\dfrac{1+\alpha_3+\alpha_1\alpha_3}{(1+\alpha_1)(1+\alpha_3)}$ | 0.796 |
| R | | o | | o | | $-\dfrac{1}{\alpha_1}$ | −2.500 |

TABLE 12

$\alpha_1 = 0.4$
$\alpha_2 = 0.4$
$\alpha_3 = 0.4$

| | $C_1$ | $C_2$ | $C_3$ | $B_1$ | $B_2$ | gear ratio | |
|---|---|---|---|---|---|---|---|
| $F_1$ | o | | | o | | $\dfrac{1}{\alpha_2}$ | 2.500 |
| $F_2$ | o | | | | o | $\dfrac{\alpha_1+\alpha_2}{\alpha_2(1+\alpha_1)}$ | 1.429 |
| $F_3$ | o | | o | | | 1 | 1.000 |
| $F_4$ | | | o | | o | $\dfrac{1}{1+\alpha_3}$ | 0.714 |
| R | | o | | o | | $-\dfrac{1}{\alpha_1}$ | −2.500 |

TABLE 13

$\alpha_1 = 0.4$
$\alpha_2 = 0.4$
$\alpha_3 = 0.35$

| | $C_1$ | $C_2$ | $C_3$ | $B_1$ | $B_2$ | gear ratio | |
|---|---|---|---|---|---|---|---|
| $F_1$ | o | | | o | | $\dfrac{1}{\alpha_2}$ | 2.500 |
| $F_2$ | o | | | | o | $\dfrac{\alpha_1+\alpha_2}{\alpha_2(1+\alpha_1)}$ | 1.429 |
| $F_3$ | o | | o | | | 1 | 1.000 |
| $F_4$ | | | o | | o | $\dfrac{1+\alpha_3}{1+\alpha_1}$ | 0.964 |
| R | | o | | o | | $-\dfrac{1}{\alpha_1}$ | −2.500 |

What is claimed is:

1. A transmission for an automotive vehicle, comprising:
   an input shaft;
   an output shaft;
   a coupling device having an input portion thereof connected to said input shaft;
   gear means for transmitting power from said coupling device to said output shaft in such a way that three forward and one reverse drives can be obtained, said gear means including first, second, third and fourth rotatable members, said fourth rotatable member being connected to said output shaft;

first and second clutches provided between said gear means and said coupling device, said first clutch being connected to said first rotatable member of said gear means, said second clutch being connected to said second rotatable member of said gear means;

a first brake for selectively braking said third rotatable member of said gear means;

a second brake for selectively braking said second rotatable member of said gear means;

a third clutch connected to said input shaft; and a planetary gear set for providing an overdrive having a predetermined gear ratio as a fourth forward drive, said predetermined gear ratio being established without affecting the gear ratios of said gear means whereby said gear ratios of said gear means are established by said rotatable members of said gear means independently of said planetary gear set, said planetary gear set having fifth, sixth and seventh rotatable members, said sixth and seventh rotatable members being connected to said gear means, said fifth rotatable member being connected to said third clutch, said over-drive being obtained when said third clutch and said second brake are engaged.

2. A transmission of claim 1, wherein said gear means includes two planetary gear sets which are arranged in such a manner that, when said first clutch and said first brake are engaged a first forward drive is obtained, when said first clutch and said second brake are engaged a second forward drive is obtained, when said first and third clutches are engaged a third forward drive is obtained, when said third clutch and said second brake are engaged said forward over-drive is obtained, and when second clutch and said first brake are engaged a reverse drive is obtained.

3. A transmission of claim 1, wherein said coupling device is a fluid coupling or hydraulic torque converter wherein said first and third clutches can be engaged so as to provide a split drive during a direct forward drive by directly connecting said input shaft with said planetary gear set.

4. A transmission of claim 1, wherein said coupling device is a torque converter.

5. A transmission of claim 1, wherein said fifth member is a ring gear, said sixth member is a sun gear and said seventh member is a carrier supporting a planetary pinion.

6. An automatic transmission for an automotive vehicle, comprising:
an input shaft;
an output shaft;
a coupling device having an input portion thereof connected to said input shaft;
a gear train set for transmitting power from said coupling device to said output shaft in such a way that three forward and one reverse drives can be obtained, said gear train set including a first planetary gear set having first, second, third and fourth rotatable members said fourth rotatable member being connected to said output shaft;
first and second clutches provided between said gear train set and said coupling device, said first clutch being connected to said first rotatable member of said gear train set, said second clutch being connected to said second rotatable member of said gear train set;

a first brake for selectively braking said third rotatable member of said gear train set;

a second brake for selectively braking said second rotatable member of said gear train set;

a third clutch connected to said input shaft; and a second planetary gear set for providing an overdrive having a predetermined gear ratio as a fourth forward drive, said predetermined gear ratio being established without affecting the gear ratios of said gear train set, whereby said gear ratios at said gear train set are established by said rotatable members of said gear train set independently of said second planetary gear set, said second planetary gear set having fifth, sixth and seventh rotatable members, said sixth and seventh rotatable members being connected to said first planetary gear set, said fifth rotatable member being connected to said third clutch so that the power from the input shaft can be transmitted to the fifth rotatable member of said second planetary gear set bypassing said coupling device, in such a way that the over-drive can be obtained when said second brake and said third clutch are engaged while the other clutches and brake are disengaged.

7. An automatic transmission as claimed in claim 6, wherein said third clutch is designed to function as a locking-up clutch.

8. An automatic transmission as claimed in claim 6, wherein the fifth, sixth and seventh rotatable members of said second planetary gear set are a ring gear, a sun gear, and a carrier for a planetary pinion, respectively.

9. An automatic transmission as claimed in claim 6, wherein said coupling device is a fluid coupling or hydraulic torque converter wherein said first and third clutches can be engaged so as to provide a split drive by directly connecting said input shaft with the fifth rotatable member of said second planetary gear set.

10. An automatic transmission as claimed in claim 6, wherein said coupling device is a torque converter.

11. An automatic transmission for an automotive vehicle, comprising an input shaft, an output shaft, a coupling device connected to said input shaft, a conventional three-speed gear train set with three forward speeds and one reverse drive, said three speed gear train being connected to said coupling device and including a first clutch, a second clutch, a first planetary gear set, a first brake, and a second brake, said first planetary set having first, second, third and fourth rotatable members, said first rotatable member being connected by way of said first clutch to said coupling device, said second rotatable member being connected by way of said second clutch to said coupling device and selectively braked by said second brake, said third rotatable member being selectively braked by said first brake;

said fourth rotatable member being directly connected to said output shaft;

a second planetary gear set having fifth, sixth and seventh rotatable members for providing an overdrive having a predetermined gear ratio as a fourth forward drive said predetermined gear ratio being established without affecting the gear ratios of said conventional three speed gear train set, whereby said gear ratios of said gear train set are established by said rotatable members of said gear train set independently of said second planetary gear set;

a third clutch placed between said second planetary gear set and said input shaft;

said fifth rotatable member being connected by way of said third clutch to said input shaft;

said sixth and seventh rotatable members being connected to two rotatable members among said first, second, third and fourth rotatable members;

a first forward speed being obtained by engaging said first clutch and said first brake;

a second forward speed being obtained by engaging said first clutch and said second brake;

a third forward speed being obtained by engaging said first and third clutches;

said overdrive being obtained by engaging said third clutch and said second brake; and a reverse drive being obtained by engaging said second clutch and said first brake.

12. An automatic transmission as claimed in claim 11, wherein said coupling device is a fluid coupling or hydraulic torque converter wherein said first and third clutches can be engaged so as to provide a split drive by directly connecting said input shaft with the fifth rotatable member of said second planetary gear set.

13. An automatic transmission as claimed in claim 11, wherein said coupling device is a torque converter.

* * * * *